July 25, 1967     L. S. JACOBSEN     3,332,321
MILLING MACHINE
Filed Oct. 24, 1965

Leif Jacobsen 3,332,321
MILLING MACHINE
Leif S. Jacobsen, 1530 N. Gordon St.,
Hollywood, Calif. 90028
Filed Oct. 24, 1965, Ser. No. 504,573
7 Claims. (Cl. 90—11)

The present invention relates to milling, boring, drilling and like machine tools and more particularly to a machine of this type having a column, a knee and a cross slide saddle.

Small milling machines which are usually mounted on a work bench are very limited in their cross feed travel.

The principal object of this invention is to provide a means by which a greater cross feed travel may be attained than is possible for a machine of like size and bulk of conventional milling machine construction.

Another object is to provide a means by which the cross slide saddle ways may be lengthened so as to give greater stability to the cross slide saddle.

A further object is to provide a new and improved column way construction to achieve greater accuracy and to reduce the tendency to chatter.

These and further objects and advantages of the present invention are attained by adding an extended forward portion and an extended rearward portion to the cross slide saddle. The column is provided with a longitudinal recess adapted to receive the extended rearward portion of the cross slide saddle; thus greater stability and greater cross feed travel is attained because of the longer cross slide guide ways which this construction permits.

A better understanding of the present invention and its objects and advantages will be had by a consideration of the preferred embodiment of the invention described in the following description and illustrated in the accompanying drawings. It is to be understood that variations of the preferred embodiment may be adopted within the scope of the invention as defined in the appended claims.

Figure 1:
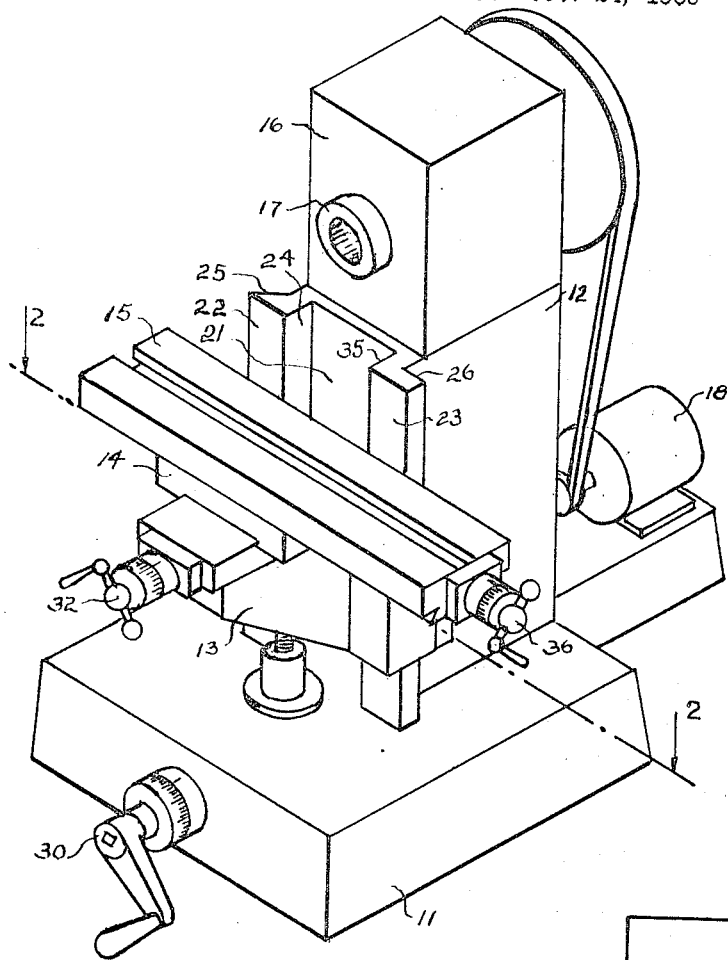
FIGURE 1 is a perspective view of the milling machine.
Figure 2:
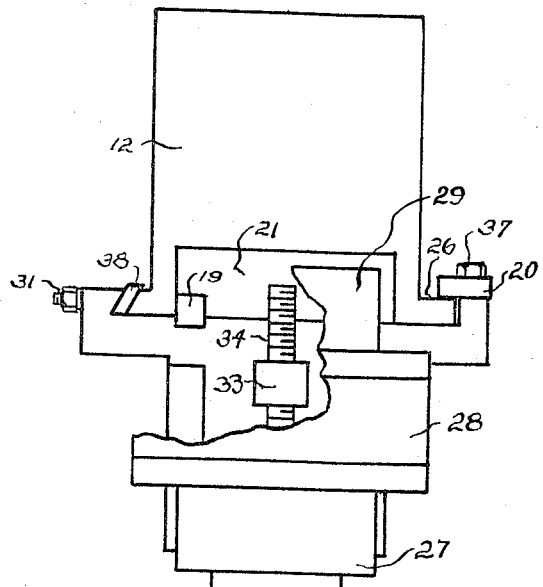
FIGURE 2 is plan view of a portion of the milling machine showing the construction of the column, the knee and the cross slide saddle.

Referring to FIGURES 1 and 2;

Column 12 is upwardly mounted from base 11. Column 12 has a longitudinal recess 21 which is bordered by parallel guide ways, first face way 22, second face way 23, first inner way 24, second inner way 35, outer way 26, gib way 25, and keeper way 26.

Knee 13 is slidably mounted on column 12 and may be moved up or down by means of vertical feed means 30.

The cross slide saddle 14 is slidably mounted on knee 13 and may be moved toward or away from column 12 by means of cross feed means 32 comprising cross feed screw nut 33 which is connected to the knee 13 and cross feed screw 34 which is operatively connected to the cross slide saddle 14. The cross feed screw moves with the cross slide saddle in contrast to the usual construction wherein the cross feed screw is connected to the knee and the cross feed nut travels with the cross slide saddle. The cross slide saddle 14 has an extended forward portion 27, a middle portion 28, and an extended rearward portion 29. When the cross slide saddle 14 is moved toward the column 12, the rearward portion 29 of the cross slide saddle 14 receeds into the longitudinal recess 21 of column 12.

The work holding table 15 is slidably mounted on cross slide saddle 14 and may be moved longitudinally by means of table feed means 36.

Key 19 is connected to knee 13 and is disposed to longitudinally abut first inner way 24. Gib 38 is adjustably interposed between the knee 13 and column 12 and is disposed to longitudinally abut gib way 25. Gib screws 31 are adjustably connected to the knee 13 and act against gib 38. Keeper 20 is adjustably connected to the knee 13 by keeper bolts 37. Keeper 20 is disposed to longitudinally abut keeper way 26.

A head 16 is mounted on column 12. A spindle means 17, for holding a cutting tool, is rotatably mounted in the head 16. A motor means 18 is operatively connected to the spindle means 17.

I claim:
1. A machine tool comprising:
   a base;
   a column mounted on said base, said column having a longitudinal recess bordered by parallel guide ways;
   a knee slidably mounted on said column;
   a vertical feed means for controlling vertical movement of said knee operatively connected thereto;
   a cross slide saddle slidably mounted on said knee;
   a cross feed means for controlling movement of said slide saddle operatively connected thereto;
   a table slidably mounted on said cross slide saddle;
   a table feed means for controlling the movement of said table operatively connected thereto;
   a head mounted on said column;
   a spindle means, for holding a cutting tool, rotatably mounted in said head;
   a motor means for driving said spindle means operatively connected thereto.

2. A machine as defined in claim one wherein said cross feed saddle comprises:
   a forward portion, a middle portion and a rearward portion, said rearward portion being capable of receding into said recess of said column.

3. A machine as defined in claim 2 wherein said parallel guide ways on at least one side of said longitudinal recess of said column comprise:
   a face way, an inner way at a right angle relative to said face way, and a gib way at an acute angle relative to said face way, thereby forming a member having a substantially semi-dove tail cross section.

4. A machine as defined in claim 3 comprising:
   a gib interposed between said knee and said gib way;
   a gib screw means adjustably connected to said knee and disposed to act against said gib.

5. A machine as defined in claim 4 comprising:
   a key connected to said knee, said key having a longitudinal surface in slidable contact with said inner way of said recess of said column.

6. A machine tool comprising:
   a base;
   a column mounted on said base, said column having a longitudinal recess bordered by parallel guide ways, said parallel guide ways on at least one side of said longitudinal recess of said column comprising a face way, an inner way at a right angle relative to said face way, an outer way at a right angle relative to said face way and a keeper way at right angle to said outer way, thereby forming a member having a substantially rectangular cross section;
   a knee slidably mounted on said column;
   a vertical feed means for controlling vertical movement of said knee operatively connected thereto;
   a cross slide saddle slidably mounted on said knee, said cross slide saddle having a rearward portion disposed to recede into said longitudinal recess of said column;
   a cross feed means for controlling movement of said cross slide saddle operatively connected thereto;
   a table slidably mounted on said cross slide saddle;
   a table feed means for controlling movement of said table operatively connected thereto;
   a head mounted on said column;

a spindle means for holding a cutting tool, rotatably mounted in said spindle;
a motor means for driving said spindle means operatively connected thereto;
a head mounted on said column;
a spindle means for holding a cutting tool, rotatably mounted in said spindle;
a motor means for driving said spindle means operatively connected thereto;
a keeper adjustably connected to said knee, said keeper disposed to longitudinally abut said keeper way.

7. A machine tool comprising:
a base;
a column mounted on said base, said column having a longitudinal recess bordered by parallel guide ways;
a knee slidably mounted on said column;
a vertical feed means for controlling vertical movement of said knee operatively connected thereto;
a cross slide saddle slidably mounted on said knee;
a feed screw nut connected to said knee;
a feed screw rotatably connected to said cross slide saddle, said feed screw disposed to mate with said feed screw nut;
a table slidably mounted on said cross slide saddle;
a table feed means for controlling movement of said table operatively connected thereto;
a head mounted on said column;
a spindle means for holding a cutting tool rotatably mounted in said head;
a motor means for driving said spindle operatively connected thereto.

No references cited.

WILLIAM W. DYER, JR., *Primary Examiner.*
GERALD A. DOST, *Examiner.*